United States Patent
Lorenz

(10) Patent No.: US 6,892,606 B2
(45) Date of Patent: May 17, 2005

(54) ARRANGEMENT FOR FASTENING A STEERING WHEEL

(75) Inventor: Christian Lorenz, Leidersbach (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 118 days.

(21) Appl. No.: 10/318,923

(22) Filed: Dec. 13, 2002

(65) Prior Publication Data
US 2003/0110883 A1 Jun. 19, 2003

(30) Foreign Application Priority Data
Dec. 14, 2001 (DE) .................................. 201 20 260U

(51) Int. Cl.⁷ ............................................. B62D 1/16
(52) U.S. Cl. .................................................. 74/552
(58) Field of Search ............................ 280/775; 74/492, 74/493, 522, 552

(56) References Cited

U.S. PATENT DOCUMENTS 4,607,539 A * 8/1986 Arima et al. ................ 74/492
5,797,622 A * 8/1998 Turner et al. ............... 280/731
6,314,833 B1 * 11/2001 Pillsbury, IV ................ 74/552
6,357,320 B1 * 3/2002 Ford et al. .................... 74/552
6,422,108 B1 * 7/2002 Hirzmann .................... 74/522

FOREIGN PATENT DOCUMENTS

DE 44 19 078 A1 12/1995

* cited by examiner

Primary Examiner—David A. Bucci
Assistant Examiner—Vicky A. Johnson
(74) Attorney, Agent, or Firm—Tarolli, Sundheim, Covell & Tummino L.L.P.

(57) ABSTRACT

An arrangement for fastening a steering wheel to a steering column comprises a steering shaft end with a contact surface for a steering wheel hub to rest on. The steering shaft end has a slit extending along a steering shaft axis, which slit produces at least two opposite steering shaft end sections. The arrangement includes a device for optionally altering a slit width.

15 Claims, 2 Drawing Sheets

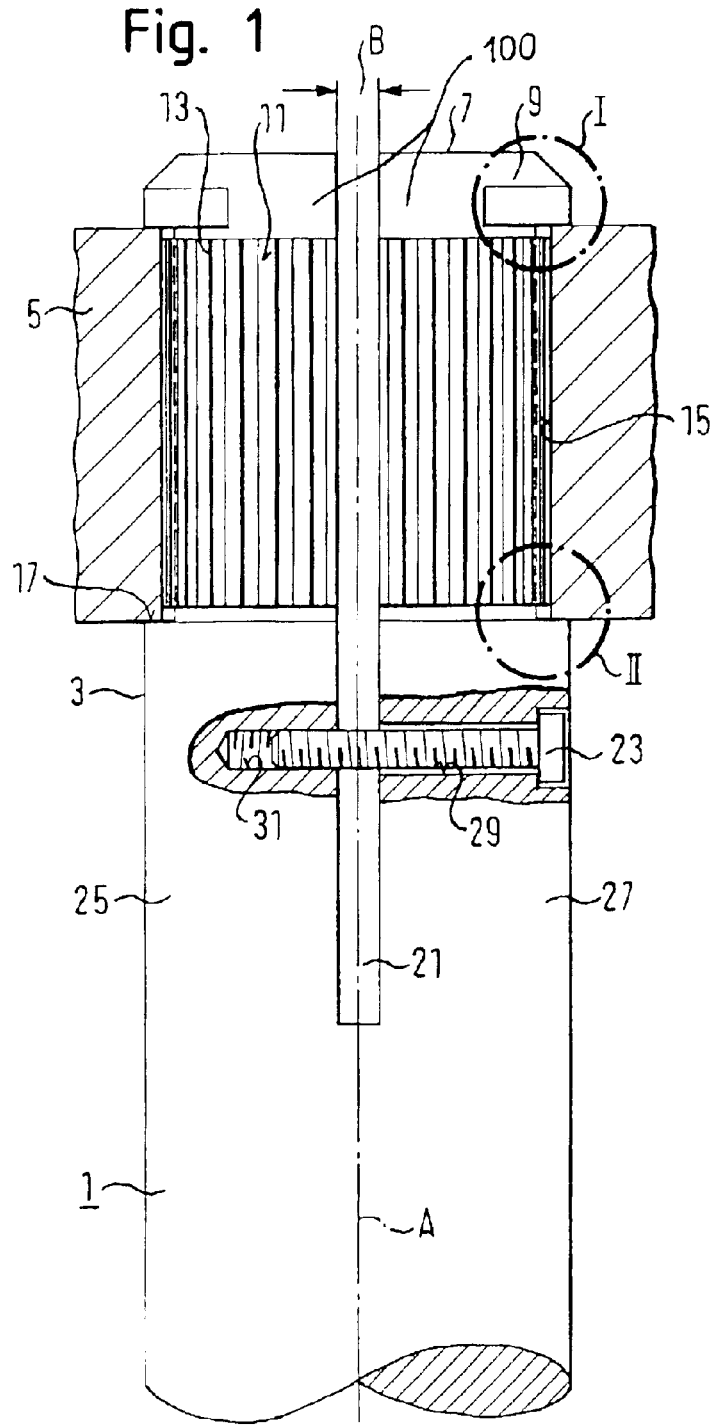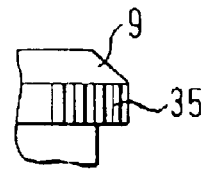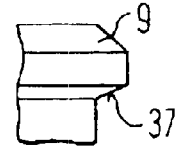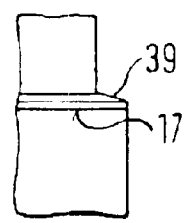

1

ARRANGEMENT FOR FASTENING A STEERING WHEEL

TECHNICAL FIELD

The invention relates to an arrangement for fastening a steering wheel to a steering shaft.

BACKGROUND OF THE INVENTION

In the past, numerous fastening arrangements have been considered, by means of which the steering wheel can be fastened detachably to the steering shaft. For example, locking parts were considered, which are displaceable radially to the steering shaft in a groove thereof. In addition, there are also solutions in which a screw or a nut is simply screwed on the end face of the steering shaft end after the steering wheel is put in place.

BRIEF SUMMARY OF THE INVENTION

The invention provides an arrangement for detachably fastening a steering wheel to a steering shaft, which consists of an extremely small number of parts and makes possible a reliable arresting of the steering wheel and also an easy dismantling. According to the invention, an arrangement for fastening a steering wheel to a steering column comprises a steering shaft end with a contact surface for a steering wheel hub to rest on. The steering shaft end has a slit extending along a steering shaft axis, which slit produces at least two opposite steering shaft end sections. The arrangement includes a device for optionally altering the slit width. The arrangement according to the invention makes provision to slit the steering shaft end in order to be able to press together or move apart the sections which are thereby produced, for which a separate device is provided. In the best instance, therefore, the arrangement only consists of the slitted steering shaft end and the device. Hence, very few parts are necessary for the installation.

The device preferably is attached to the steering shaft end and engages both steering shaft end sections and alters the slit width such that the steering wheel can be slipped axially onto the steering shaft and/or can be arrested on the steering shaft upon amending the slit width. The device is, for example, a screw which is turned in a counter-thread in one of the steering shaft sections.

A radially projecting shoulder, which is preferably provided on the steering shaft end, is intended to prevent a drawing off of the steering wheel, which, viewed from the steering shaft end, is positioned axially behind the shoulder. The slit must be able to be altered by the device such that the hub can be slipped over the shoulder. Then, the steering shaft end sections must be moved away from each other again so far that the shoulder prevents a drawing off of the hub.

Preferably, the contact surface is constructed as a form-fitting shaft/hub connection, in particular with teeth running axially, which makes possible a slipping on of the steering wheel hub in axial direction.

For a better axial securing of the hub on the steering shaft end, it is intended to construct the steering shaft end in the region of the contact surface with smaller radial dimensions than at the part/s of the steering shaft end adjoining this contact surface. Depending on whether the two adjoining parts have a greater radial dimension than the steering shaft end in the region of the contact surface, one or two shoulders on the end face, which serve as axial stops, can be formed.

Preferably at least one of the two shoulders is constructed conically, so that by changing the slit width, the steering shaft hub is braced axially between at least a cone and an opposite shoulder on the end face, in order to remove play from the fastening arrangement.

The device for altering the slit width preferably lies, viewed from the steering shaft end, axially behind the contact surface. This is intended to make it possible that no corresponding access openings have to be provided on the steering shaft hub for actuation of the device.

Viewed from the steering shaft end, the slit runs transversely to the steering shaft axis continuously, preferably radially continuously; the slit, in the latter option, being intended to divide the steering shaft end into two equal steering shaft end sections.

The arrangement preferably comprises not only the steering shaft end and the device, but also the steering shaft hub which is coordinated with the steering shaft end.

BRIEF DESCRIPTION OF THE DRAWINGS

FIG. 1 shows a side view of a steering shaft end and, in section, of a steering wheel hub fastened thereto, and also of an arrangement according to the invention for fastening in accordance with a first embodiment, FIG. 3 shows the framed region of the steering shaft end, designated by I in FIG. 1, which is modified in this region, FIG. 4 shows the framed region, designated by I in FIG. 1, which is further modified slightly differently, and FIG. 5 shows the framed region, designated by II in FIG. 1, which is constructed slightly modified.

DETAILED DESCRIPTION OF THE PREFERRED EMBODIMENTS

Figure 2:
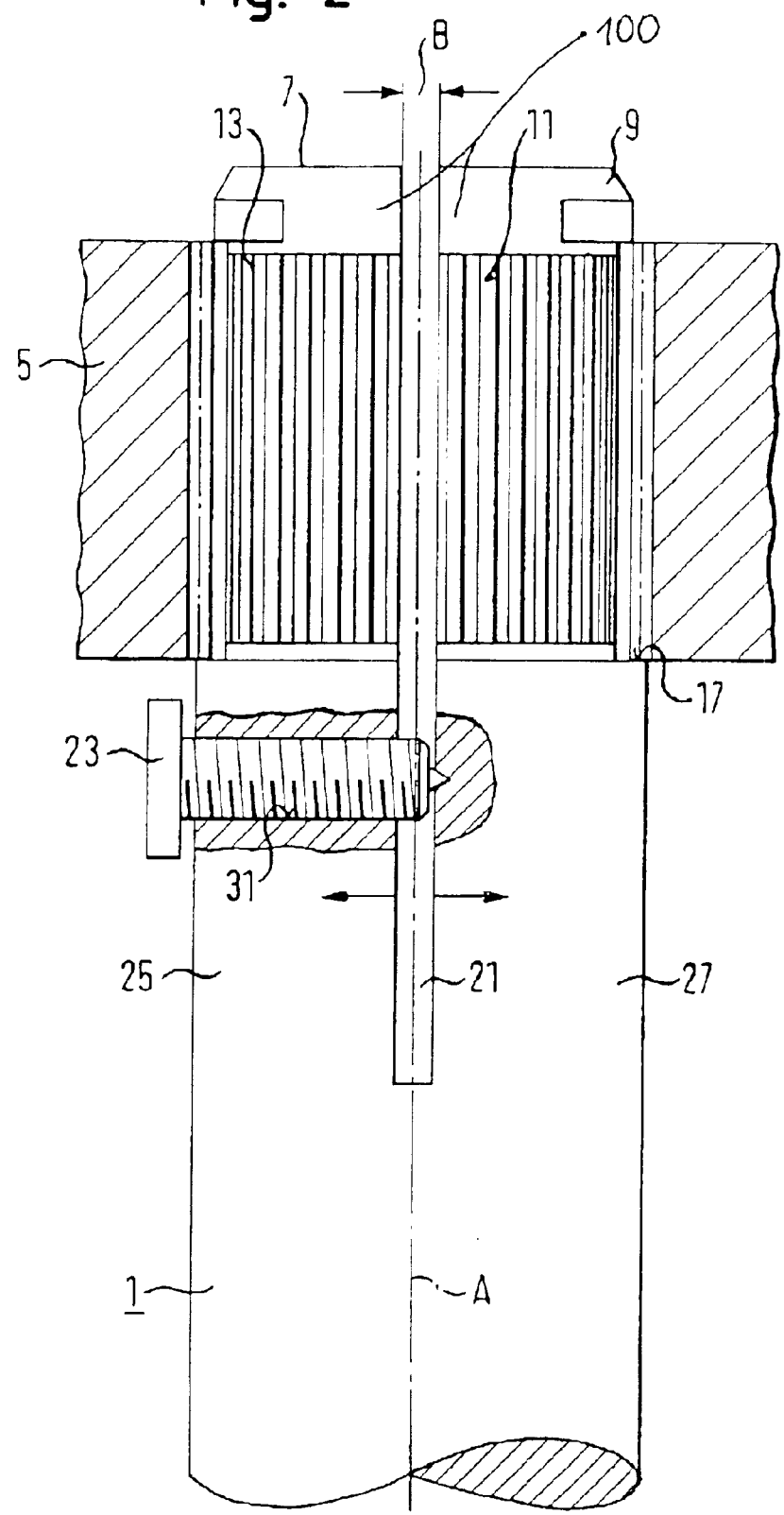
FIG. 2 shows a side view of a steering shaft end and, in section, of a steering wheel hub fastened thereto, and of an arrangement according to the invention for fastening in accordance with a second embodiment.

In FIG. 1 a steering shaft 1 is illustrated, with a steering shaft end 3, on which the hub 5 of a steering wheel is fastened. Viewed from the end 7 of the steering shaft, the latter firstly has a radially projecting shoulder 9 and then a section with a smaller radial extent, which forms a contact surface 11 to the steering wheel hub 5. In the region of the contact surface, a shaft/hub connection is provided in the form of axially extending teeth, in particular spline teeth 13. The hub 5 has corresponding counter-teeth on its receiving opening 15.

After the contact surface 11, the steering shaft end 3 has a shoulder 17, so that the steering wheel hub 5 is positioned axially between the shoulder 9 and the shoulder 17, preferably so as to be free of play.

The steering shaft end has a radial and continuous slit 21, extending along the steering shaft axis A, with a slit width B, measured at the end of the steering shaft 1.

A radial screw 23, viewed from the steering shaft end, is arranged axially behind the contact surface 11 and behind the shoulder 17. The screw 23 forms a device for the optional altering of the slit width B.

The slit 21 divides the steering shaft end 3 into two opposite steering shaft end sections 25, 27, preferably of equal size. In section 27, a passage opening 29 is provided for receiving the screw 23. In section 25, on the other hand, a threaded bore 31 is arranged, which is in alignment with the passage opening 29 and into which the screw 23 is turned.

The slitted steering shaft end 3 and the screw 23 form an arrangement for fastening the steering wheel, symbolized by the steering wheel hub 5, to the steering shaft 1. Optionally, the steering wheel hub 5 can also be added to the arrangement for fastening the steering wheel to the steering shaft 1.

For the purpose of axially slipping the steering wheel onto the steering shaft, the screw is tightened, so that the width B of the slit is reduced. As soon as the two sections 25, 27 are guided so close together that they are smaller than the diameter of the hub 5, the latter can be slipped on. Then the screw is turned in the opposite direction again, so that the width B of the slit becomes larger again. Then the hub 5 sits, also axially positioned, firmly on the steering shaft, and the teeth engage into each other.

Since, through altering the width B of the slit, the measurement of the steering shaft end only takes place transversely to the slit width, the shoulder 9 must be laterally flattened in those marginal regions 100 which lie close to the slit 21, because in these regions, by reduction of the width B of the slit, the dimension of the shoulder 9 is not altered in radial direction.

The embodiment according to FIG. 2 corresponds substantially to that shown in FIG. 1, so that sections or components having the same function are given the reference numbers which have already been introduced, and hereinbelow only the differences are dealt with.

In the embodiment according to FIG. 2, there is provided in the steering shaft end section 25 a thread 31, into which the screw 23 is turned. In the steering shaft end section 27, on the other hand, there is no opening. Rather, when the screw 23 is being screwed in, its point presses against the steering shaft end section 27, so that the width B of the slit 21 is enlarged.

When the hub 5 is being slipped on, the screw 23 does not press the steering shaft end sections 25, 27 together and preferably also does not project into the slit 21. The steering shaft end sections 25, 27 can therefore be moved towards each other when the hub 5 is being slipped on, if the hub is to be slightly narrower than the dimension of the shoulder 9. On the other hand, for easier dismantling, it is advantageous if the hub is slightly larger than the shoulder 9. As soon as the hub 5 sits fully on the contact surface 11, the screw 23 is turned in the thread 31 and the slit 21 is widened. Then the teeth on the inner face of the hub 5 and on the contact face 11 engage into each other, so that in peripheral direction a form-fitting connection is produced. The shoulder 9 also travels radially outwards and secures the slipped-on hub 5 in axial direction.

Optionally, as illustrated in FIG. 3, the shoulder 9 can likewise have teeth in the region of a cylindrical outer periphery. The teeth form an axial guide contour 35 which is intended to facilitate the alignment of the steering wheel on installation in peripheral direction relative to the steering shaft 1. The teeth forming the axial guide contour are aligned exactly to the teeth 13, i.e. the hub slides axially along the axial guide contour 35, so as to then engage into the teeth 13 without being able to be turned.

In order to rule out an axial play between the hub 5 and the steering shaft 1, a cone 37 can be provided in the region of the shoulder 9 and/or in the region of the shoulder 17 towards the contact surface 11. The hub 5 is constructed in this region with a corresponding counter-cone. Alternatively, or in addition to the cone 37, an elastic element 39, e.g. an elastomeric plate or a spring plate, can be arranged between one of the shoulders 9, 17 and the hub 5, in order to axially pre-stress the hub 5 with respect to the steering shaft 1, and to avoid an axial play between the two.

The slit 21 is illustrated in the Figures as a radially continuous slit, intersecting the axis A. Optionally, it would also be conceivable for the slit 21 to run outside the axis A. Furthermore, it also would not have to be constructed so as to be continuous. For example, the steering shaft 21 could be hollow in construction at least in the region of the steering shaft end 3, so that it could be sufficient, to achieve a radial resilience, to only lead the slit up to the hollow interior of the steering shaft end 3.

Optionally, also, two slits 21, not in alignment with each other, could lead to the hollow steering shaft end 3, in order to produce two separate circle segments, viewed from the steering shaft end, which are movable relative to each other.

What is claimed is:

1. An arrangement for fastening a steering wheel to a steering column comprising
   a steering shaft end with a contact surface for a steering wheel hub to rest on,
   said steering shaft end having a slit extending along a steering shaft axis, which slit produces at least two opposite steering shaft end sections,
   a device for optionally altering a slit width, and said steering shaft end having an initial outer dimension in a non-actuated state of said device,
   said device, on actuation, pulling said end sections towards each other and reducing said slit width so that said steering shaft end has an outer dimension less than said initial outer dimension.

2. The arrangement according to claim 1, wherein said device engages both steering shaft end sections and alters said slit width such that said steering wheel can be slipped axially onto said steering shaft and can be arrested on said steering shaft.

3. The arrangement according to claim 1, wherein said device is a screw which is turned in a counter-thread in one of said steering shaft end sections.

4. The arrangement according to claim 1, wherein at least one .shoulder adjoining said contact surface is provided on said steering shaft end.

5. The arrangement according to claim 4, wherein said shoulder is constructed so as to be conical.

6. The arrangement according to claim 4, wherein said at least one shoulder of said steering shaft end projects radially outwardly.

7. The arrangement according to claim 6, wherein said at least one shoulder has on said steering shaft end on an outer periphery at least one axial guide contour which prevents a rotation of said steering wheel hub when being slipped onto said shaft.

8. The arrangement according to claim 7, wherein said contact surface is constructed as a form-fitting shaft/hub connection.

9. The arrangement according to claim 8, wherein said shaft/hub connection has axial teeth.

10. The arrangement according to claim 9, wherein said guide contour is aligned with said axial teeth.

11. The arrangement according to claim 1, wherein said steering shaft end has in a region of said contact surface smaller radial dimensions than a portion of said steering shaft end adjoining thereto.

12. The arrangement according to claim 1, wherein said slit, viewed from said steering shaft end, extends transversely to said steering shaft axis preferably in a radial direction and right through said steering shaft end.

13. The arrangement according to claim 1, wherein an elastic element is arranged on said steering shaft end, which exerts an axial force onto said steering wheel hub.

14. A arrangement for fastening a steering wheel to a steering column comprising a steering wheel hub having a receiving opening with a minimum opening dimension, a steering shaft end with a contact surface for a said steering shaft end having a slit extending along a steering shaft axis, which slit produces at least two opposite steering shaft end sections, a device for optionally altering a slit width, and said steering shaft having a free end with a radially outwardly protruding shoulder having an initial outer dimension in a non-actuated state of said device larger than said minimum opening dimension, said device, on actuation, moving said end sections towards each other and reducing said slit width so that said steering shaft has an outer dimension less than said initial outer dimension to allow insertion of said free end into said receiving opening so that said shoulder engages behind a portion of said receiving opening having said minimum dimension.

15. An arrangement for fastening a steering wheel to a steering column comprising said arrangement having a steering shaft end with a contact surface for a steering wheel hub to rest on, said steering shaft end having a slit extending along a steering shaft axis, which slit produces at least two opposite steering shaft end sections, and said arrangement having a device for optionally altering a slit width arranged axially behind said contact surface when viewed from said steering shaft end.

* * * * *

UNITED STATES PATENT AND TRADEMARK OFFICE
CERTIFICATE OF CORRECTION

PATENT NO.    : 6,892,606 B2
DATED         : May 17, 2005
INVENTOR(S)   : Lorenz It is certified that error appears in the above-identified patent and that said Letters Patent is hereby corrected as shown below:

Column 5,
Line 3, after "a" (second occurrence) insert -- steering wheel hub to rest on --.

Signed and Sealed this

Twentieth Day of December, 2005

JON W. DUDAS
*Director of the United States Patent and Trademark Office*